US011745891B2

(12) United States Patent
Rheaume et al.

(10) Patent No.: US 11,745,891 B2
(45) Date of Patent: Sep. 5, 2023

(54) AIRCRAFT FUEL SYSTEM WITH ELECTROCHEMICAL HYDROGEN COMPRESSOR

(71) Applicant: Raytheon Technologies Corporation, Farmington, CT (US)

(72) Inventors: Jonathan Rheaume, West Hartford, CT (US); Robert Mason Darling, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 191 days.

(21) Appl. No.: 17/227,602

(22) Filed: Apr. 12, 2021

(65) Prior Publication Data
US 2021/0316877 A1 Oct. 14, 2021

Related U.S. Application Data

(60) Provisional application No. 63/009,561, filed on Apr. 14, 2020.

(51) Int. Cl.
*B64D 37/30* (2006.01)
*B64D 27/24* (2006.01)
(Continued)

(52) U.S. Cl.
CPC ............ *B64D 37/30* (2013.01); *B64D 27/10* (2013.01); *B64D 27/24* (2013.01);
(Continued)

(58) Field of Classification Search
CPC combination set(s) only.
See application file for complete search history.

(56) References Cited

U.S. PATENT DOCUMENTS 5,106,035 A * 4/1992 Langford, III ......... B64D 27/24
244/62
9,017,890 B2 * 4/2015 Mata ................. H01M 8/04708
429/434
(Continued)

FOREIGN PATENT DOCUMENTS

DE 102016001472 A1 * 10/2016
DE 102006047176 B4 * 2/2018 ........ H01M 8/04149
(Continued)

OTHER PUBLICATIONS

Machine translation of DE 102016001472 A1 (Year: 2016).*
(Continued)

*Primary Examiner* — Joshua J Michener
*Assistant Examiner* — Cindi M Curry
(74) *Attorney, Agent, or Firm* — Carlson, Gaskey & Olds, P.C.

(57) ABSTRACT

A propulsion system according to an exemplary embodiment of this disclosure, among other possible things includes a fuel storage tank that is configured to store a fuel in a compressed state, a power generation device that is configured to consume the fuel and generate an output, a fuel system that is configured to provide the fuel from the fuel storage tank to the power generation device, and an electrochemical compressor that is in communication with the fuel system. The electrochemical compressor is configured to gather residual fuel from the fuel system and communicate the gathered residual fuel to at least one of the power generation device and the fuel storage tank.

19 Claims, 4 Drawing Sheets

(51) Int. Cl.
  *B64D 27/10* (2006.01)
  *H01M 8/0258* (2016.01)
  *H01M 8/0267* (2016.01)
  *B64D 37/02* (2006.01)
  *B64D 27/02* (2006.01)
  *B64D 41/00* (2006.01)

(52) U.S. Cl.
  CPC ....... *H01M 8/0258* (2013.01); *H01M 8/0267* (2013.01); *B64D 37/02* (2013.01); *B64D 2027/026* (2013.01); *B64D 2041/005* (2013.01); *H01M 2250/20* (2013.01)

(56) References Cited

U.S. PATENT DOCUMENTS

| | | | | |
|---|---|---|---|---|
| 10,277,095 | B2 * | 4/2019 | Perry | B01D 53/326 |
| 10,724,432 | B2 * | 7/2020 | Shapiro | H01M 8/2428 |
| 2003/0205641 | A1 * | 11/2003 | McElroy | B64C 39/024 |
| | | | | 244/53 R |
| 2003/0207164 | A1 * | 11/2003 | McElroy | B64D 27/24 |
| | | | | 244/30 |
| 2004/0211679 | A1 | 10/2004 | Wong et al. | |
| 2012/0251899 | A1 * | 10/2012 | Lehar | H01M 8/0668 |
| | | | | 429/417 |
| 2016/0123226 | A1 * | 5/2016 | Razak | F02C 7/18 |
| | | | | 60/39.15 |
| 2018/0261860 | A1 * | 9/2018 | Jahnke | H01M 8/0612 |
| 2019/0148753 | A1 * | 5/2019 | Jahnke | H01M 8/04111 |
| | | | | 429/411 |
| 2019/0293324 | A1 | 9/2019 | Bahar et al. | |
| 2020/0023306 | A1 | 1/2020 | Ukai et al. | |
| 2021/0207537 | A1 * | 7/2021 | Roberge | F02C 3/20 |
| 2021/0300575 | A1 * | 9/2021 | Staubach | B64D 13/08 |
| 2022/0131165 | A1 * | 4/2022 | Ballantine | B01D 53/02 |
| 2022/0166041 | A1 * | 5/2022 | Mitsuta | H01M 8/04753 |

FOREIGN PATENT DOCUMENTS

| | | | | |
|---|---|---|---|---|
| DE | 102021129872 A1 * | 5/2022 | ........ | H01M 8/04119 |
| JP | 2005268056 A | 9/2005 | | |
| JP | 2008251177 A | 10/2008 | | |
| JP | 2018165385 A | 10/2018 | | |
| WO | WO-2022087207 A1 * | 4/2022 | ............. | B01D 53/02 |

OTHER PUBLICATIONS

Electrochemical Hydrogen Compressor, Wikipedia, Feb. 18, 2020, https://en.wikipedia.org/wiki/Electrochemical_hydrogen_compressor.

Fishel, K. et al., Electrochemical Hydrogen Pumping, Springer International Publishing Switzerland 2016, pp. 527-540.

* cited by examiner

AIRCRAFT FUEL SYSTEM WITH ELECTROCHEMICAL HYDROGEN COMPRESSOR

CROSS-REFERENCE TO RELATED APPLICATIONS

This disclosure claims priority to U.S. Provisional Patent Application No. 63/009,561 filed Apr. 14, 2020.

BACKGROUND

A gas turbine engine typically mixes a carbon based fuel with air within a combustor where it is ignited to generate a high-energy exhaust gas flow. The high-energy exhaust gas flow includes carbon that is eventually exhausted into the environment. Alternative engine structures and fuels may aid in the reduction and/or elimination of carbon emissions. One such fuel includes hydrogen. Hydrogen fuel properties require non-traditional storage structures and systems to practically leverage positive environmental and performance aspects.

Turbine engine manufacturers continue to seek further improvements to engine performance including improvements to environmental impact, thermal transfer and propulsive efficiencies.

SUMMARY

A propulsion system according to an exemplary embodiment of this disclosure, among other possible things includes a fuel storage tank that is configured to store a fuel in a compressed state, a power generation device that is configured to consume the fuel and generate an output, a fuel system that is configured to provide the fuel from the fuel storage tank to the power generation device, and an electrochemical compressor that is in communication with the fuel system. The electrochemical compressor is configured to gather residual fuel from the fuel system and communicate the gathered residual fuel to at least one of the power generation device and the fuel storage tank.

In a further embodiment of the foregoing, the power generation device is at least one of a combustor or a fuel cell.

In a further embodiment of any of the foregoing, the propulsion system further includes a thermal management system that is disposed between the fuel system and the electrochemical compressor. The thermal management system is configured to transfer thermal energy into the gathered residual fuel.

In a further embodiment of any of the foregoing, the power generation device includes a combustor that is configured to generate a high energy exhaust gas flow. The propulsion system includes a check valve that is disposed between the fuel system and the combustor to provide flow from the fuel system to the combustor and to limit flow from the combustor to the fuel system.

In a further embodiment of any of the foregoing, the power generation device includes a combustor that is configured to generate a high energy exhaust gas flow. The electrochemical compressor is configured to remove fuel from the fuel system when the combustor is off.

In a further embodiment of any of the foregoing, the propulsion system further includes a pressure sensor that is configured to measure a fuel pressure. The electrochemical compressor is configured to remove fuel from the fuel system when a measured fuel pressure is within a range.

In a further embodiment of any of the foregoing, the electrochemical compressor includes at least one membrane-electrode-assembly.

In a further embodiment of any of the foregoing, the propulsion system includes a second fuel storage tank that is configured to receive residual fuel from the electrochemical compressor and communicate fuel to the power generation device.

In a further embodiment of any of the foregoing, the fuel includes compressed and/or liquid hydrogen.

A power generation system according to an exemplary embodiment of this disclosure, among other possible things includes a fuel cell that is configured to generate an electric power output, a fuel system that is configured to communicate fuel to the fuel cell and an electrochemical compressor in communication with the fuel system. The electrochemical compressor is configured to gather residual fuel from the fuel system. The fuel cell and the electrochemical compressor include a stack that is configured to operate in a first mode to remove residual fuel from the fuel system and in a second mode to produce the electric power output.

In a further embodiment of any of the foregoing, the power generation system includes a fuel storage tank that is configured to communicate fuel to the fuel system and receive fuel from the electrochemical compressor and a three way control valve between the stack and the fuel storage tank. The three way control valve is configured to direct fuel back to the fuel storage tank from the stack when operating in the first mode and to exhaust depleted air and prevent airflow to the fuel storage tank when the stack is operating in the second mode.

In a further embodiment of any of the foregoing, the electrochemical compressor includes at least one membrane-electrode-assembly.

In a further embodiment of any of the foregoing, the power generation system further includes a thermal management system that is disposed between the fuel system and the electrochemical compressor. The thermal management system is configured to transfer thermal energy into the gathered residual fuel.

In a further embodiment of any of the foregoing, the power generation system includes a combustor that is configured to generate a high energy exhaust gas flow output.

In a further embodiment of any of the foregoing, the compressed fuel includes hydrogen.

A method of operating propulsion system according to an exemplary embodiment of this disclosure, among other possible things includes storing a compressed fuel in a fuel storage tank, communicating fuel from the fuel storage tank through a fuel system to a power generation device that is configured to consume fuel and generate an output, recovering residual fuel from the fuel system with an electrochemical compressor, and communicating the recovered residual fuel to at least one of the power generation device and the fuel storage tank.

In a further embodiment of any of the foregoing, the method includes transferring thermal energy into the recovered residual fuel in a thermal management system that is disposed between the fuel system and the electrochemical compressor.

In a further embodiment of any of the foregoing, the method includes removing the residual fuel from the fuel system in response to the power generation device being turned off.

In a further embodiment of any of the foregoing, the method includes measuring a fuel pressure within the fuel system and operating the electrochemical compressor to remove excess fuel from the fuel system when a measured fuel pressure is within a predefined range.

In a further embodiment of any of the foregoing, the fuel includes hydrogen.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
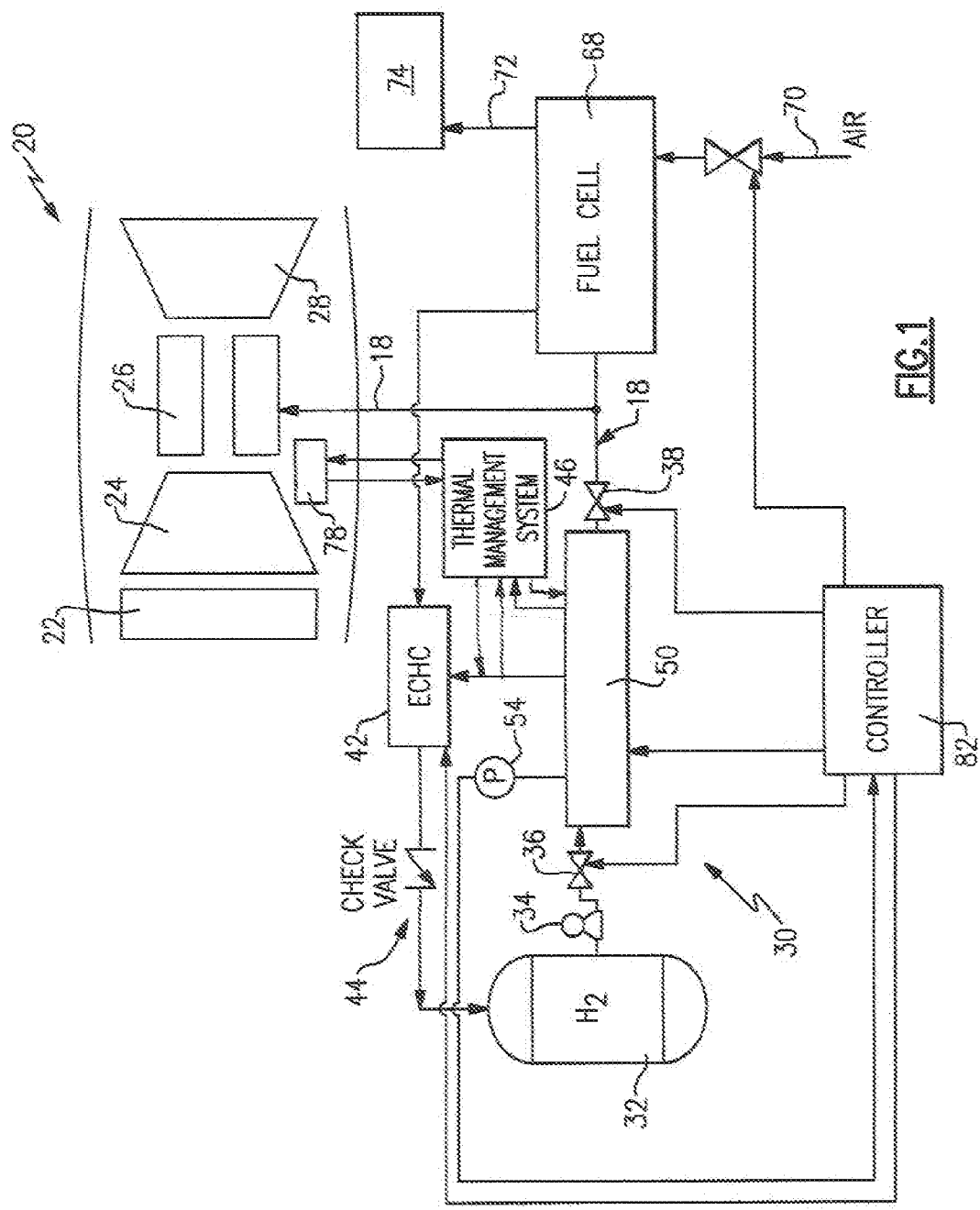
FIG. 1 is a schematic view of a hydrogen based aircraft fuel system.

FIG. 1 schematically illustrates a hydrogen fuel based aircraft fuel system 30. The fuel system 30 supplies a hydrogen based fuel to power generation device such as a combustor of a turbine engine 20 or a fuel cell 68. The example engine 20 includes the combustor 26 that receives compressed air from a compressor section 24. A flow 18 of hydrogen based fuel is mixed with air and ignited in the combustor 26 to generate a high energy exhaust gas flow that expands through a turbine section 28. The turbine section 28 provides an output in the form of shaft power utilized to generate a propulsive thrust. The turbine section 28 is coupled to drive a fan 22 and the compressor section 24.

The fuel cell 68 combines and reacts the hydrogen based fuel with air to create an output in the form of electric power 72 that can be used to power an electric system 74. The example system 74 may be part of an aircraft system or an accessory system for the turbine engine 20. As appreciated, the hydrogen based fuel may be in the form of compressed or liquid hydrogen ($H_2$). As appreciated, fuel systems utilizing other alternative fuels that involve a hydrogen stream and/or conversion of fuel to include some portion of hydrogen may also benefit from this disclosure.

The fuel system 30 includes a fuel storage tank 32 for holding the hydrogen based fuel. In this example, the hydrogen fuel is in the form of compressed hydrogen. The storage tank 32 is sealed from the ambient environment. Hydrogen based fuels are stored in the storage tank in a compressed state at a pressure greater than an ambient pressure and at low temperatures. In one disclosed example, the hydrogen fuel is stored at a pressure in excess of 2 kpsi (13.8 MPa) and less than 20 kpsi (137 MPa). However, other pressure ranges are within the contemplation of this disclosure.

The fuel system 30 includes a pressure regulator 35 and a control valve 36 between the storage tank 32 and a fuel delivery network 50. The fuel delivery network 50 may include passages, nozzles, heat exchangers, regulators and any other features that are required to transport and condition fuel as may be needed for use in the combustor 26 and/or the fuel cell 68. Moreover, although the example thermal management system 46 is shown providing cooling for an engine system, the thermal management system 46 may provide for cooling of aircraft systems. Additionally, hydrogen within the fuel system 30 may be used as a heat sink to cool superconducting cables, aircraft electronics and other sources of heat onboard an aircraft. A pressure sensor 54 is schematically shown to provide for sensing of pressures within components of the fuel delivery network 50.

Fuel from the fuel delivery network 50 is communicated through a control valve 38 to the combustor 26 and/or the fuel cell 68 as needed to provide desired operation. As appreciated, although a single valve 38 is schematically shown, several valves 38 could be utilized as needed to communicate fuel to various locations in the combustor 26. Additional control valves would be provided to communicate fuel for use by the fuel cell 68.

A thermal management system 46 uses fuel within the delivery network 50 as a heat sink to absorb thermal energy from various engine systems as schematically indicated at 78. The thermal management system 46 may also transfer thermal energy into residual fuel gathered from the fuel delivery network. The engine system 78 may be a lubrication system, electrical system, a cooling air system or any other heat generating engine system.

During operation, fuel flows from the storage tank 32 in either liquid or gaseous form through the delivery network 50 to the combustor 26 and/or the fuel cell 68. When the engine 20 and fuel cell 68 are turned off, some residual fuel may remain within the delivery network 50. The residual fuel within the delivery network 50 is reclaimed by an electrochemical hydrogen compressor (ECHC) 42. A controller 82 operates the ECHC 42 as well as the valves 36 and 38 to enable reclamation of residual hydrogen based fuel.

In this example, the ECHC 42 reclaims residual fuel and directs that fuel back to the fuel storage tank 32. A check valve 44 is disposed between the ECHC 42 and the storage tank 44 to ensure one-way flow. The control valve 38 is closed to prevent hydrogen escape. The ECHC 42 may be operated once the engine 20 or fuel cell 68 is turned off. The ECHC 42 may also be operated upon detection of a pressure with the fuel pressure sensor 54 above a predefined range. In one disclosed example, the predefined pressure that initiates operation is a pressure that is about 0.5 psi (3.4 kPa) above ambient pressure. In another disclosed example, the predefined range of pressure that initiates operation is a pressure that is about 10 psi 69 kPa) above ambient pressure. In another disclosed example, the predefined pressure is between 6 psi and 15 psi (41 kPa to 103 kPa) above ambient pressure. In these examples, the term ambient pressure refers to pressures outside of the fuel delivery network 50. As appreciated, in most operational conditions, ambient pressure will be that pressure at ground level that is approximately 14.7 psi (101 kPa) at sea level.

Figure 2:
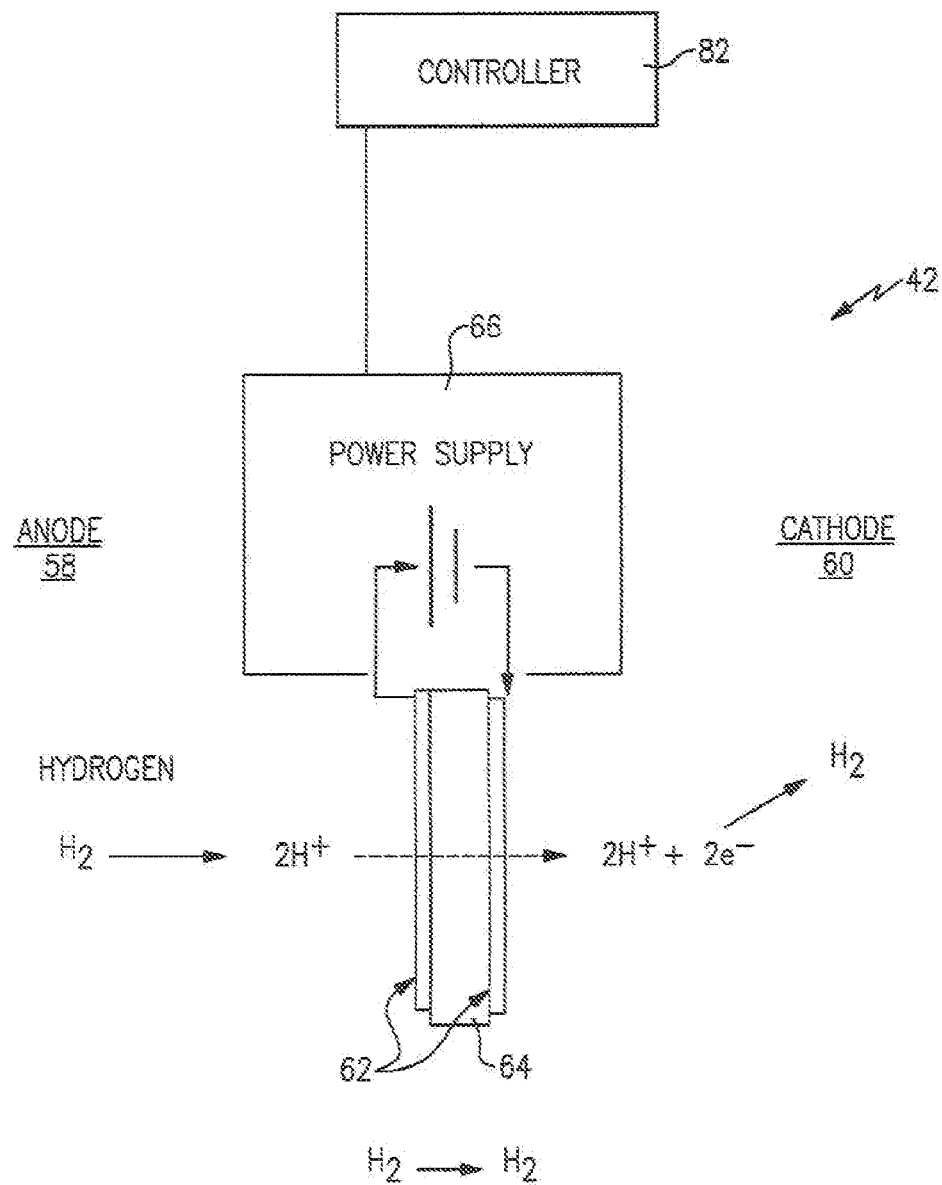
FIG. 2 is a schematic view of an example electrochemical hydrogen compressor.

Referring to FIG. 2, with continued reference to FIG. 1, the example ECHC 42 includes porous electrodes 62 containing catalyst and ionically conducting ionomer. The electrodes 62 are separated by a proton exchange membrane 64. A bias voltage is applied by a power supply 66 to electrodes 62 to cause the hydrogen to oxidize into protons and electrons at an anode 58. The protons are transported through the proton exchange membrane 64 and the electrons are transported through the power supply 66 by the electrochemical potential due to the applied bias voltage. At a cathode 60, the electrons and protons combine to form diatomic hydrogen gas. As the process continues, hydrogen gas formed at the cathode 60 is communicated to the storage tank 32. As more hydrogen gas is added to the tank 32, the pressure rises accordingly. Although an example ECHC 42 is disclosed by way of example, other configurations of an electrochemical hydrogen compressor could be utilized and are within the contemplation and scope of this disclosure.

The ECHC 42 operates within predetermined temperature and pressure limits. Accordingly, the ECHC 42 may include heaters, coolers and heat exchangers to thermally regulate hydrogen temperature. The ECHC 42 may also include a humidifier and/or a condenser to regulate a humidity level of hydrogen and to facilitate ion transport through the electrodes 62. The humidifier and/or condenser may be operated when the engine 20 or fuel cell 68 is off by way of the controller 82.

Upon removal of the residual hydrogen, the ECHC 42 may be turned off. The removal of residual fuel may be determined based on a predetermined time and/or may be based on a measured pressure within the fuel delivery network 50.

Figure 3:
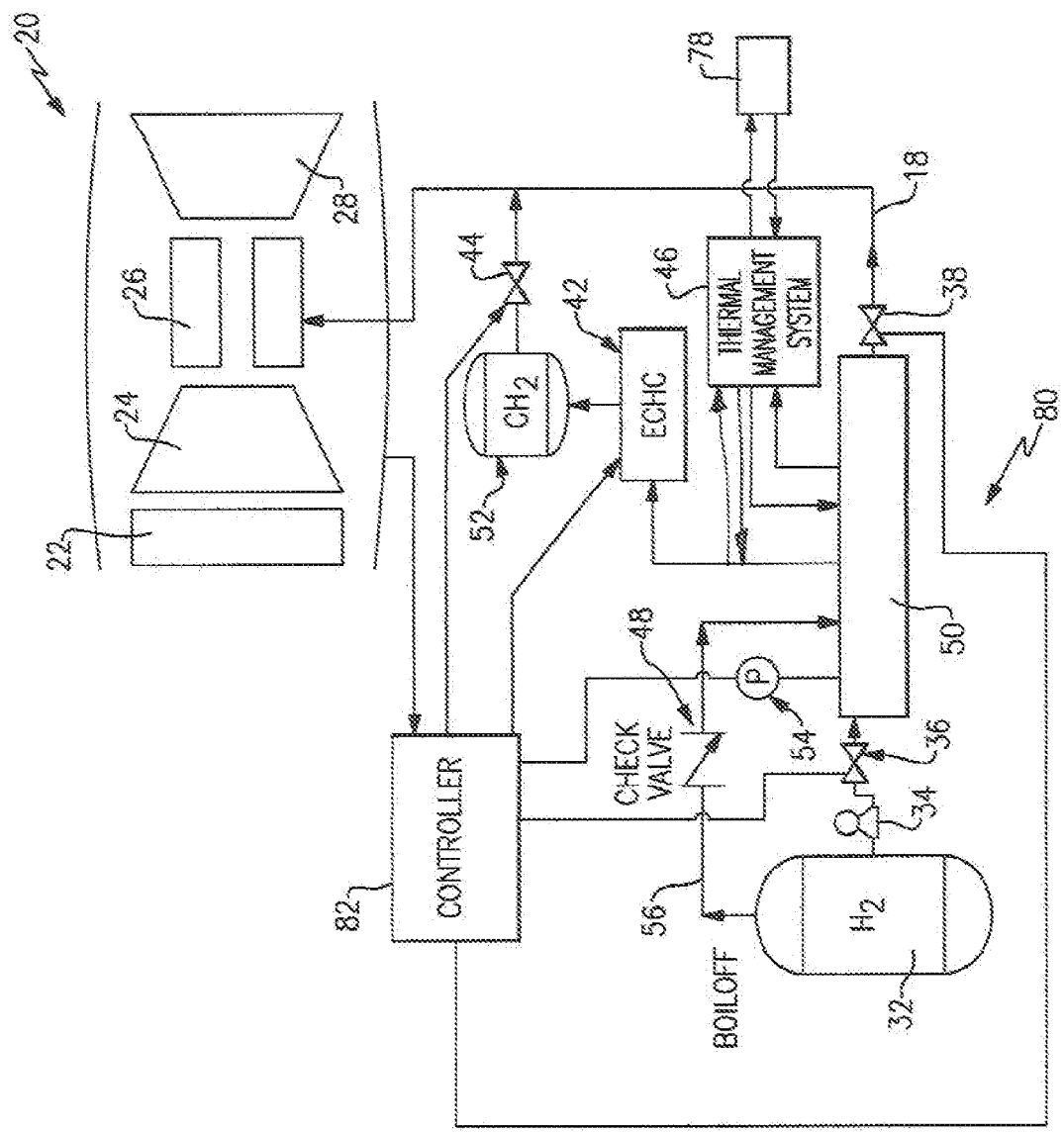
FIG. 3 is a schematic view of another hydrogen based aircraft fuel system.

Referring to FIG. 3, another example fuel system 80 is schematically shown with liquid hydrogen ($H_2$). A pump 34 is provided instead of the regulator 35 to communicate liquid hydrogen to the fuel delivery network 50 through the control valve 36. The fuel system 80 includes a passage 56 for communicating hydrogen gas from the storage tank 32 to the fuel delivery network 50. The boiling point of liquid hydrogen is around −320° F. and therefore some portion of hydrogen may boil off from a cryogenic storage vessel exposed to ambient environmental conditions. Some portion of liquid hydrogen within the tank 32 boils off and recovered through the passage 56. The passage 56 communicates the hydrogen gas to an appropriate location within the fuel delivery network 50 for further communication as fuel flow 18 for use in the combustor 26.

Check valve 48 is provided to prevent fuel from the fuel delivery network 50 from going back to the storage tank 32. Hydrogen communicated through the passage 56 is pressurized prior to communication with the combustor 26. The ECHC 42 can be used for pressurization prior to communication with the combustor 26.

Residual fuel within the fuel delivery network 50 is removed by the ECHC 42 and communicated to a second storage tank 52. The recovered fuel is stored as compressed hydrogen in the second storage tank 52 instead of being directed back to the storage tank 32. Additionally, for fuel systems utilizing hydrocarbon fuels that generate hydrogen, the ECHC 42 could be utilized to separate hydrogen out of a mixed stream.

The example ECHC 42 may operate continuously to maintain a desired state of fuel within the fuel delivery network 50. The ECHC 42 may also be operated by a controller 82. The controller 82 may operate the ECHC 42 based on information from the fuel pressure sensor 54. A pressure within the fuel delivery network 50 is monitored and the ECHC 42 turned on when a pressure indicative of excess hydrogen gas is detected. Fuel from the second tank 52 can be communicated through a control valve 44 to the combustor 26.

Figure 4:
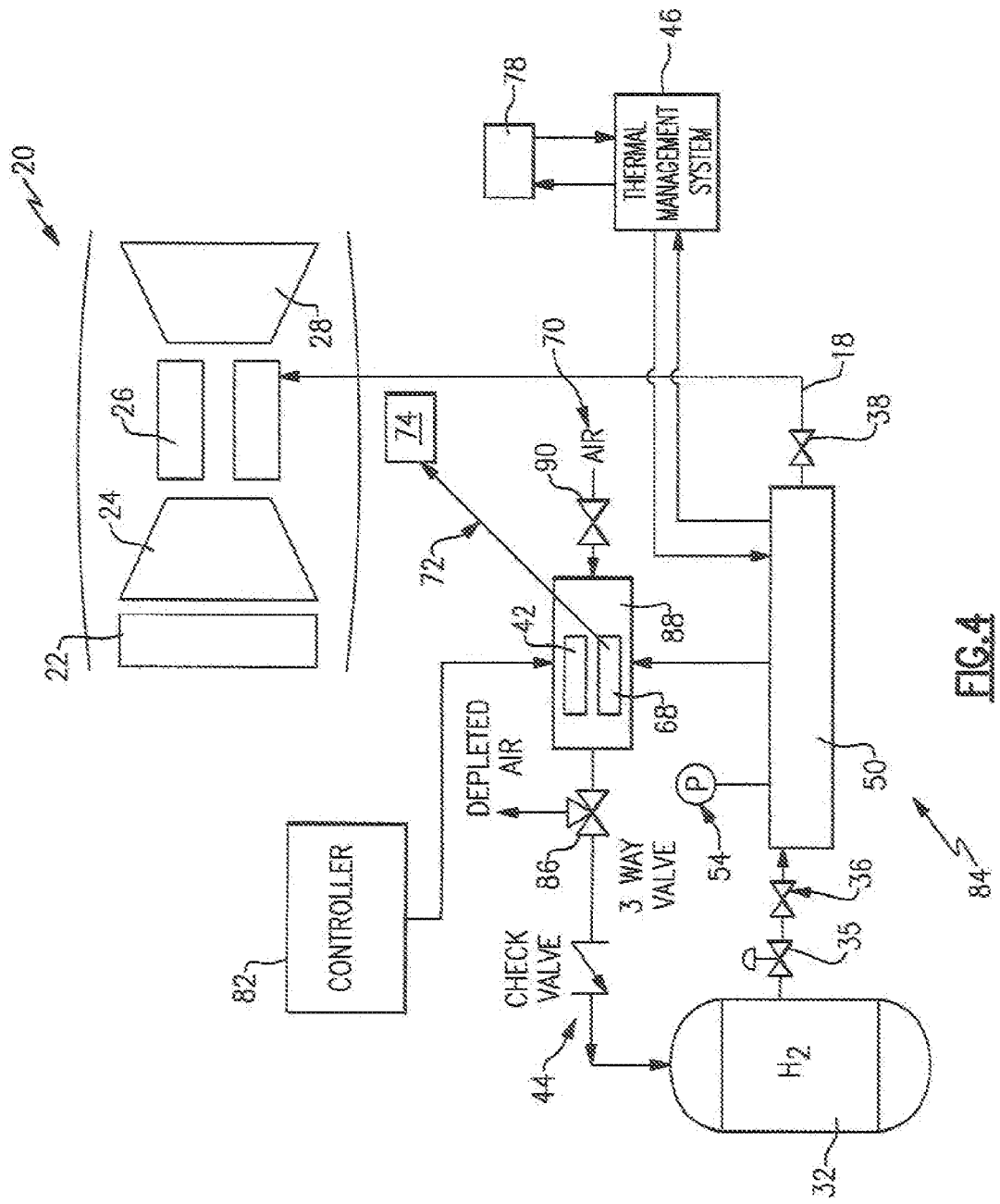
FIG. 4 is a schematic view of another hydrogen based aircraft fuel system.

Referring to FIG. 4, another example fuel system 84 includes a stack 88 that in a first mode operates as an ECHC 42 to remove residual fuel and in a second mode as a fuel cell 68 to produce electric power. Fuel flow 18 is also communicated to a combustor 26. A controller 82 controls operation of the stack 88 based on a predefined profile that may correspond with an aircraft operating profile. The controller 82 may operate the stack 88 based on sensed conditions of the fuel delivery network 50.

In the first mode, the stack 88 operates as the ECHC 42 and reclaims hydrogen from the fuel delivery network 50. The reclaimed hydrogen is directed back to the fuel tank 32 through a 3-way control valve 86 and a check valve 44. The 3-way control valve 86 is operated to enable fuel flow to the tank 32 but no airflow to the tank 32. Moreover, an inlet valve 90 for air is shutoff to prevent undesired mixing with the reclaimed hydrogen.

In the second mode, the stack 88 operates as the fuel cell 68 to generate electric power 72. When the engine 20 is operating and hydrogen fuel is flowing through the fuel delivery network 50, a portion of fuel can be directed to the stack 88. The inlet valve 90 is opened to provide inlet airflow 70. The 3-way valve 86 is opened to exhaust depleted air and closed to prevent flow to the tank 32. The 3-way valve 86 is operated to prevent airflow from being directed into the tank 32. The fuel cell 68 can be operated to replace and/or supplement generators to provide some or all electric power 72 required for various aircraft or engine operation.

Accordingly, the disclosed example fuel systems utilized an ECHC to reclaim and remove residual fuel from the fuel delivery network to prevent waste and improve operating efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system, comprising:
   a fuel storage tank configured to store a fuel in a compressed state;
   a fan;
   a compressor section configured to compress an inlet airflow;
   a combustor configured to mix the compressed inlet airflow with the fuel to generate a high energy exhaust gas flow;
   a turbine section where the high energy exhaust gas flow from the combustor is expanded to provide a power output that drives the compressor section and the fan;
   a fuel system configured to provide the fuel from the fuel storage tank to the combustor; and
   an electrochemical compressor in communication with the fuel system, the electrochemical compressor configured to gather residual fuel from the fuel system and communicate the gathered residual fuel to at least one of the combustor and the fuel storage tank.

2. The propulsion system as recited in claim 1, further comprising a thermal management system disposed between the fuel system and the electrochemical compressor, the thermal management system being configured to transfer thermal energy into the gathered residual fuel.

3. The propulsion system as recited in claim 1, wherein the propulsion system includes a check valve disposed between the fuel system and the combustor to provide flow from the fuel system to the combustor and to limit flow from the combustor to the fuel system.

4. The propulsion system as recited in claim 1, wherein the electrochemical compressor is configured to remove fuel from the fuel system when the combustor is off.

5. The propulsion system as recited in claim 1, further comprising a pressure sensor configured to measure a fuel pressure, wherein
   the electrochemical compressor is configured to remove fuel from the fuel system when a measured fuel pressure is within a range.

6. The propulsion system as recited in claim 1, wherein the electrochemical compressor includes at least one membrane-electrode-assembly.

7. The propulsion system as recited in claim 1, including a second fuel storage tank configured to receive residual fuel from the electrochemical compressor and communicate fuel to the combustor.

8. The propulsion system as recited in claim 1, wherein the fuel includes compressed and/or liquid hydrogen.

9. A power generation system, comprising:
a fuel cell configured to generate an electric power output;
a fuel system configured to communicate fuel to the fuel cell;
a fuel storage tank configured to communicate fuel to the fuel system, wherein the fuel storage tank is configured to store fuel at a pressure greater than an ambient pressure; and
an electrochemical compressor in communication with the fuel system, the electrochemical compressor configured to gather residual fuel from the fuel system, wherein the fuel cell and the electrochemical compressor comprise a stack configured to operate in a first mode to remove residual fuel from the fuel system, pressurize the removed fuel and communicate that pressurized fuel back to the fuel storage tank and in a second mode to produce the electric power output.

10. The power generation system as recited in claim 9, including a three way control valve between the stack and the fuel storage tank, wherein the three way control valve is configured to direct fuel back to the fuel storage tank from the stack when operating in the first mode and to exhaust depleted air and prevent airflow to the fuel storage tank when the stack is operating in the second mode.

11. The power generation system as recited in claim 9, wherein the electrochemical compressor includes at least one membrane-electrode-assembly.

12. The power generation system as recited in claim 10, further comprising a thermal management system disposed between the fuel system and the electrochemical compressor, the thermal management system being configured to transfer thermal energy into the gathered residual fuel.

13. The power generation system as recited in claim 9, including a combustor configured to ignite a mixture of air and fuel from the fuel system to generate a high energy exhaust gas flow output.

14. The power generation system as recited in claim 9, wherein the compressed fuel comprises hydrogen.

15. A method of operating propulsion system comprising:
storing a compressed fuel in a fuel storage tank;
communicating fuel from the fuel storage tank through a fuel system to a power generation device configured to consume fuel and generate an output;
recovering residual fuel from the fuel system with an electrochemical compressor; and
communicating the recovered residual fuel to the fuel storage tank.

16. The method as recited in claim 15, including transferring thermal energy into the recovered residual fuel in a thermal management system disposed between the fuel system and the electrochemical compressor.

17. The method as recited in claim 15, including removing the residual fuel from the fuel system in response to the power generation device being turned off.

18. The method as recited in claim 15, including measuring a fuel pressure within the fuel system and operating the electrochemical compressor to remove excess fuel from the fuel system when a measured fuel pressure is within a predefined range.

19. The method as recited in claim 15, wherein the fuel comprises hydrogen.

* * * * *